United States Patent [19]
Haneda

[11] Patent Number: 6,087,835
[45] Date of Patent: Jul. 11, 2000

[54] LAN TESTER

[75] Inventor: Masaji Haneda, Tokyo, Japan

[73] Assignee: NTT Data Corporation, Tokyo, Japan

[21] Appl. No.: 08/809,808

[22] PCT Filed: Jul. 26, 1996

[86] PCT No.: PCT/JP96/02106

§ 371 Date: Mar. 11, 1997

§ 102(e) Date: Mar. 11, 1997

[87] PCT Pub. No.: WO97/05494

PCT Pub. Date: Feb. 13, 1997

[30] Foreign Application Priority Data

Jul. 26, 1995 [JP] Japan .................................. 7-189992
May 27, 1996 [JP] Japan .................................. 8-132164

[51] Int. Cl.$^7$ ............................................. G01R 31/02
[52] U.S. Cl. ............................................. 324/539; 324/66
[58] Field of Search ........................... 324/66, 51, 52, 324/179, 175, 540, 539, 542

[56] References Cited

U.S. PATENT DOCUMENTS 4,551,671  11/1985  Annunziata et al. ..................... 324/51
4,901,003   2/1990  Clegg ..................................... 324/66

FOREIGN PATENT DOCUMENTS 59-43373   3/1984  Japan .
330874     3/1991  Japan .
4269668    9/1992  Japan .

OTHER PUBLICATIONS

"Commonsware Australia Pty. Ltd." Catalog, pp. 102, 104, and 105 1995 edition.
"Farnell Components" Catalog, pp. 660–661 Sep. 1996.

*Primary Examiner*—Josie Ballato
*Assistant Examiner*—Vincent Q. Nguyen
*Attorney, Agent, or Firm*—Bachman & LaPointe, P.C.

[57] ABSTRACT

A LAN tester 1 for carrying out a conduction test, a polarity test and an operation test of LAN wiring includes a power supply section (2) for supplying a power supply current to one of paired signal lines to be tested at one end thereof; a current detecting section (3) for detecting the current flowing through the other of the signal lines; a forward polarity detecting section (4) for detecting positive and negative pulses from positive and negative signal lines, respectively; a reverse polarity detecting section (5) for detecting negative and positive pulses; a first change-over switch (6) for operating the power supply section (2) and the current detecting section (3) in a conduction test mode and operating the forward polarity detecting section (4) and the reverse polarity detecting section (5) in a polarity test mode; and a second change-over switch (7) for realizing an operation test mode by connecting a connection terminal of a transmission signal line and a connection terminal of a reception signal line for looping in the polarity test mode. According to this arrangement, the LAN tester can be provided which is capable of carrying out a cable conduction test and a reverse connection confirmation test as well as a simple operation test with a HUB included, only at one end.

7 Claims, 7 Drawing Sheets

LAN TESTER

TECHNICAL FIELD

The present invention relates to a testing device which can easily perform disconnection, short circuit and polarity checks, a connection test, a reverse connection test and the like in a LAN (Local Area Network).

BACKGROUND ART

Conventionally, relatively small-scale data processing devices, such as personal computers, have been normally used independently. However, owing to the recent improvement in data throughput and the recent tendency in downsizing, construction of a distributed processing system by connecting a plurality of data processing devices within a specific area in a company or a department to form a network or construction of a simple network rather than performing a distributed processing, for example, has been frequently performed for effectively using accumulated data.

Such a network is generally called a LAN. The simplest LAN construction includes an arrangement wherein a network OS (Operating System) and peer-to-peer 10BASE2 or 10BASE-T, etc. are combined. Among them, the LAN connection based on 10BASE-T is relatively simple and can be carried out at a user side without asking an expert. For this reason, upon constructing the LAN based on 10BASE-T, the wiring thereof has been often done by the user individually.

However, even though the 10BASE-T wiring is so easy, if there is a wiring miss, the network does not work. Further, as a scale of the LAN increases, the number of cables also increases so that the wiring thereof becomes complicated. Under these circumstances, if, for example, a fault, such as cable disconnection or misfiring, occurs, a procedure is necessary for finding which cable is subjected to the fault. For such a procedure, a method has been used, wherein loopback connectors are connected to both ends of each cable and a dedicated cable tester including a loop resistance, etc. is connected, and then a conduction test is carried out relative to each cable, so that presence/absence of disconnection or misfiring can be confirmed per cable to search for a cable which is subjected to the fault.

However, in such a conventional disconnected cable searching method, it is necessary to connect the loopback connectors to both ends of a cable to be tested. In order to connect, after connecting a loopback connector to one end, a loop back connector also to the other end, an operation is necessary for tracing the cable having the loopback connector connected to one end thereof. This operation for finding out the cable to which the loopback connector is connected is an awful operation in the complicated wiring. Thus, the conventional conduction test requires extremely large labor for finding the fault.

Further, a problem is raised, wherein the connecting operation for the loopback connector for performing the conduction test causes a new fault, such as misconnection or contact failure, etc. Moreover, the conventional conduction test has a problem that only a test for cable can be achieved, and a connection confirmation test inclusive of a HUB, etc. can not be achieved.

The present invention has a subject to solve the foregoing problems and to provide a LAN tester which is capable of carrying out a cable conduction test and a miswiring confirmation test as well as a simple operation test inclusive of a HUB, etc. only at one end.

DISCLOSURE OF INVENTION

For achieving the foregoing subject, when performing a conduction test, a LAN tester of the present invention selects (or non-optional) a conduction test mode as an operation mode by a change-over switch (first change-over switch), and comprises a power supply section for supplying, at one end of paired signal lines having two signal lines, a power supply current to one of the signal lines, and a current detecting section for detecting, at the one end of the paired signal lines to be tested, the current flowing in the signal line to which no power supply current is supplied by the power supply section. By this arrangement, when a fault, such as disconnection, exists in the signal line, the current is not detected by the current detecting section, while, when no abnormality exists in the signal line, a given current is detected by the current detecting section.

When performing a polarity test, a LAN tester of the present invention selects (or non-optional) a polarity test mode as an operation mode by a change-over switch (first change-over switch), and comprises a forward polarity detecting section for detecting positive pulses from a positive signal line and negative pulses from a negative signal line at one end of the signal lines to be tested, and a reverse polarity detecting section for detecting negative pulses from the positive signal line and positive pulses from the negative signal line at the one end of the signal lines to be tested. By this arrangement, when the pulses are detected by the forward polarity detecting section, it is confirmed that the signal lines are in the normal polarity. On the other hand, when the pulses are detected by the reverse polarity detecting section, it is confirmed that the signal lines are in the reverse polarity.

When performing an operation test, a LAN tester of the present invention selects (or non-optional) an operation test mode as an operation mode by a first change-over switch and a second change-over switch, and comprises a loopback connecting section for connecting terminals for connecting transmission signal lines and terminals for connecting reception signal lines, respectively, a forward polarity detecting section for detecting positive pulses from a positive signal line and negative pulses from a negative signal line at one end of the signal lines to be tested, and a reverse polarity detecting section for detecting negative pulses from the positive signal line and positive pulses from the negative signal line at the one end of the signal lines to be tested. By this arrangement, since th pulses in the transmission signal lines are looped back to the reception signal lines so as to produce a false signal, an operation state of the HUB or AUI (terminal) to be connected can be confirmed by the forward polarity detecting section and the reverse polarity detecting section.

When performing a confirmation test of a connecting direction, a LAN tester of the present invention, similar to the case of the conduction test, selects (or non-optional) a conduction test mode as an operation mode by a change-over switch (first change-over switch), and comprises a power supply section for supplying a power supply current to one of signal lines at one end of the paired signal lines to be tested, a current detecting section for detecting, at the one end of the paired signal lines, the current flowing in the signal line to which no power supply current is supplied by the power supply section, and a reverse connection confirmation circuit connected to the two signal lines at the other end of the paired signal lines. The reverse connection confirmation circuit includes a pair of unidirectional elements connected reversely In parallel, at least one of which unidirectional elements indicates a state thereof upon energization. By this arrangement, since the states of the unidirectional elements in the reverse connection confirmation circuit differ depending on the forward connection and the reverse connection, the connection state can be confirmed.

For performing a confirmation test of connecting directions about a plurality of the paired signal lines, it is preferable to arrange a plurality of the reverse connection confirmation circuits, and provide power supply control means for controlling a power feed timing of the power supply section supplying a power supply current to the plurality of paired signal lines connected to the respective reverse connection confirmation circuits.

BEST MODE FOR CARRYING OUT THE INVENTION

Now, an embodiment of a LAN tester of the present invention will be described with reference to FIGS. 1–13.

Figure 1:
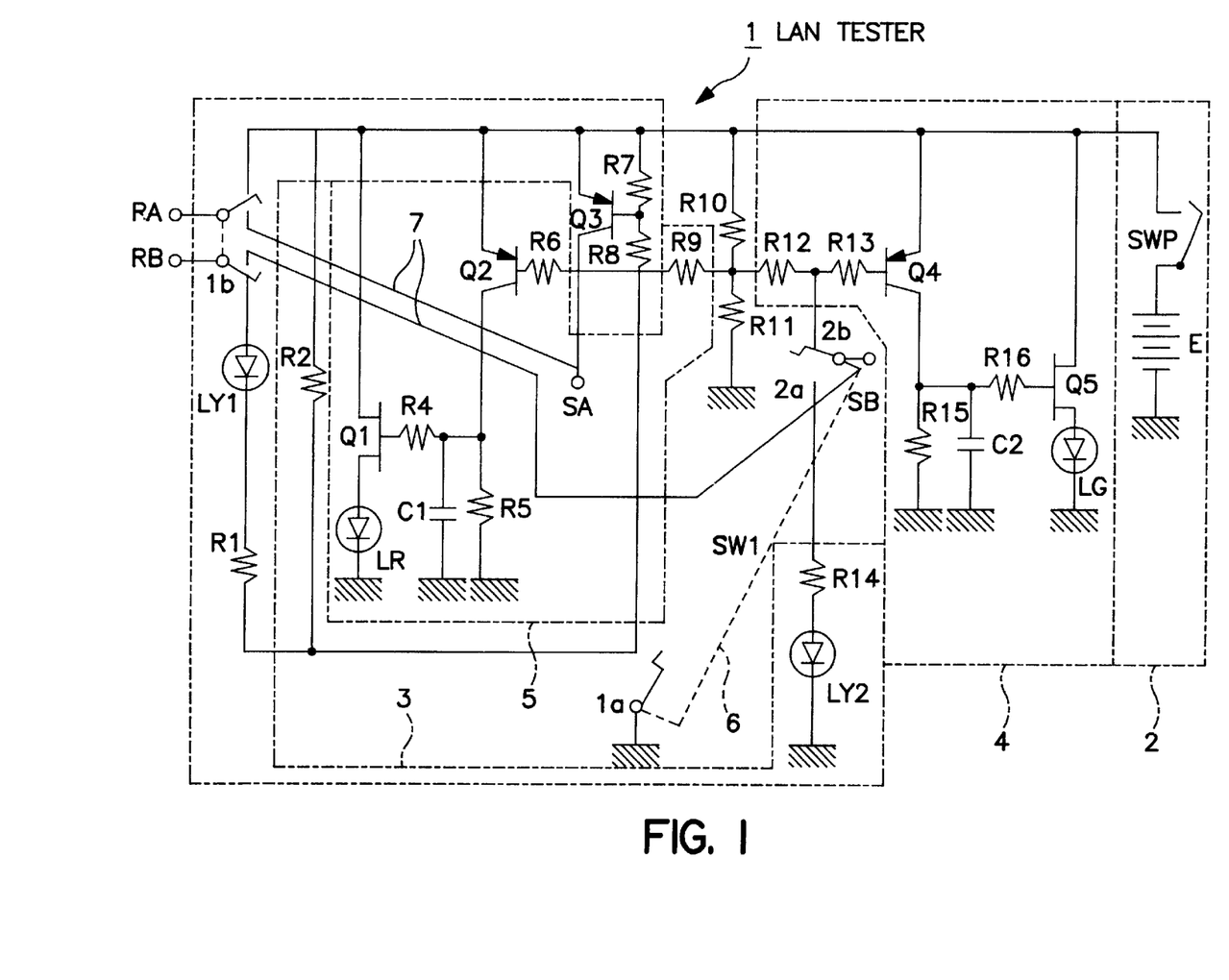
FIG. 1 is a circuit diagram showing an embodiment of a LAN tester according to the present invention.

FIG. 1 is a circuit diagram showing an example when carrying out the LAN tester. The LAN tester roughly includes a power supply section 2, a current detecting section 3, a forward polarity detecting section 4, a reverse polarity detecting section 5, a first change-over switch (change-over switch) 6, and a second change-over switch 7 having a function of a loopback connecting portion. In the figure, RA and RB denote reception terminals, and SA and SB denote transmission terminals.

The power supply section 2 includes a power supply switch SWP and an internal battery E. The current detecting section 3 includes a bipolar transistor Q3, light-emitting diodes LY1 and LY2 which light up in yellow, and a plurality of resistors R1, R7, R8 and R14. The resistors R7 and R8 are provided for turning on the bipolar transistor Q3 while turning off a bipolar transistor Q2 so as to supply the power supply current to the transmission terminal SA. It is suitable to set R1 and R14 to about 560 Ω, respectively, and R7 and R8 to about 10 kΩ.

The forward polarity detecting section 4 includes a bipolar transistor Q4, a field-effect transistor Q5, a light-emitting diode LG which lights up in green, resistors R12, R13, R15 and R16, and a capacitor C2. The reverse polarity detecting section 5 includes the bipolar transistor Q2, a field-effect transistor Q1, a light-emitting diode LR which lights up in red, resistors R4, R5, R6 and R9, and a capacitor C1. The resistors R10 and R11 are provided for applying biases to the bipolar transistors Q2 and Q4. The capacitor C1 and the resistor R5, and the capacitor C2 and the resistor R15 constitute smoothing circuits, respectively. It is suitable to set R6, R9, R12 and R13 to about 1 kΩ, respectively, R10 to about 270 Ω, R11 to about 4.7 kΩ, R4 and R16 to about 500 kΩ, respectively, R5 and R15 to about 5 MΩ, respectively, and C1 and C2 to about 0.1 µF, respectively.

Figure 3:
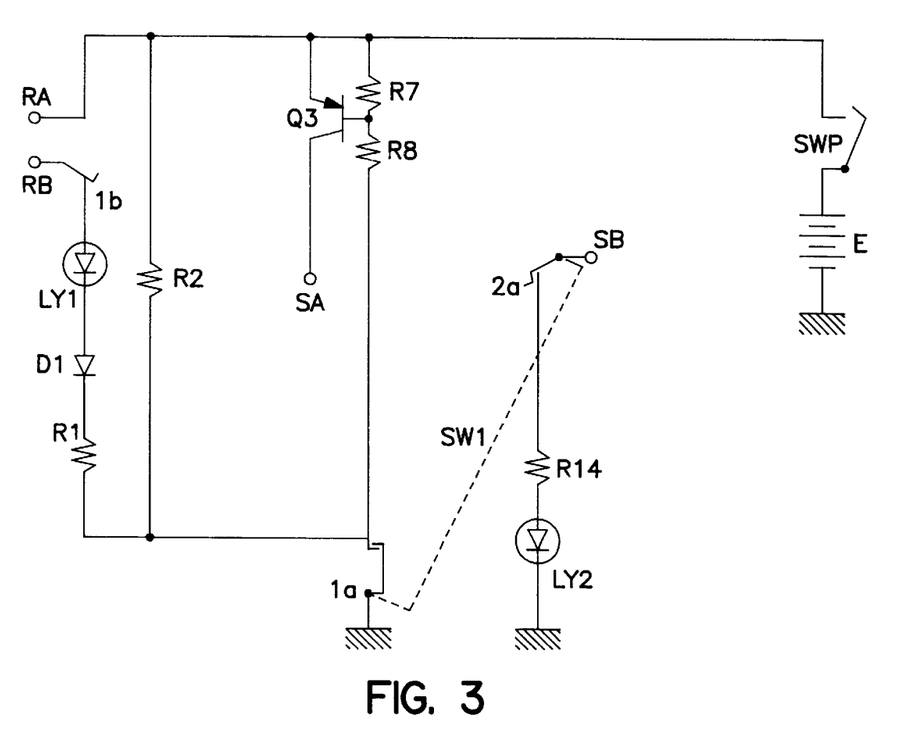
FIG. 3 is a diagram extracting the principal part of FIG. 1 for explaining an operation example in the conduction test using the LAN tester of the present invention.
Figure 10A:
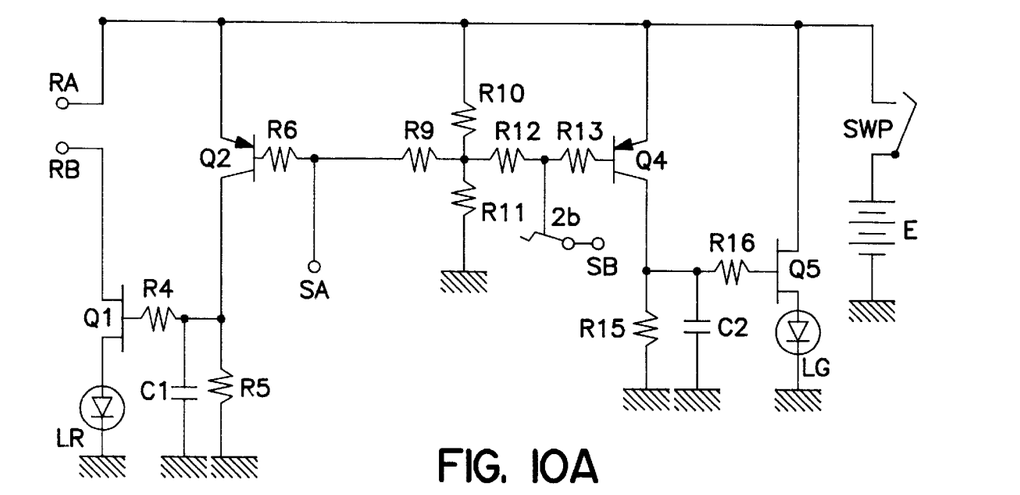
FIGS. 10(a) and (b) are diagrams extracting the principal part of FIG. 1 for explaining an operation example in the simple operation test using the LAN tester of the present invention.
Figure 10B:
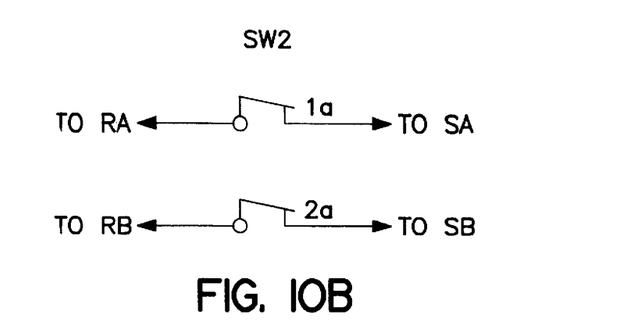

As shown in FIG. 3, the first change-over switch 6 performs an on-off operation for a connection terminal 1a and includes a switch SW1 for connecting the transmission terminal SB to a connection terminal 2a or 2b. As shown in FIG. 10(b), the second change-over switch 7 includes a switch SW2 for connecting between the transmission terminal SA and the reception terminal RA and between the transmission terminal SB and the reception terminal RB.

Now, tests using the LAN tester of the present invention will be explained, respectively.

Figure 2:
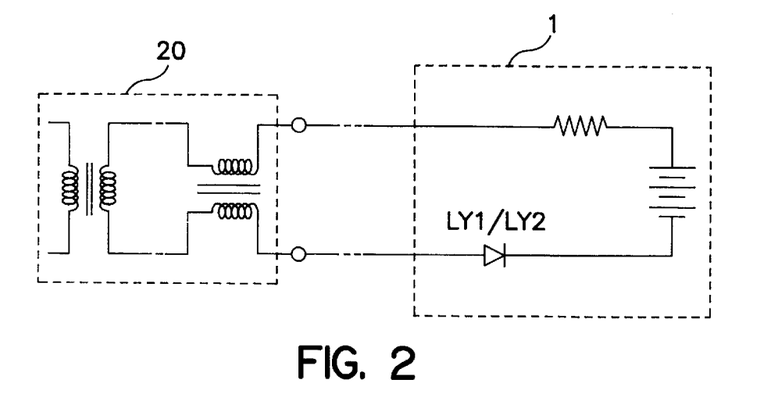
FIG. 2 is a diagram showing a connection relationship to a HUB or AUI when performing a conduction test using the LAN tester of the present invention.

FIG. 2 is a diagram showing a connection relationship to a HUB (or AUI) 20 when performing a conduction test using the LAN tester of the present invention. FIG. 3 is a circuit diagram extracting the principal part of FIG. 1 for explaining an operation example in the conduction test.

Specifically, in the conduction test, the bipolar transistor Q2 is turned off when the bipolar transistor Q3 is turned on, and monitoring of pilot data is stopped. Further, by opening the switch SW1 (portion 2b), a signal current does not flow to the bipolar transistor Q4 which thus does not operate. Accordingly, the LAN tester 1 shown in FIG. 1 becomes equivalent to a circuit shown in FIG. 3.

First, when performing a conduction test of reception lines, as shown in FIG. 2, the HUB 20 is connected to the reception terminals RA and RB of the LAN tester 1, and the power supply switch SWP is closed. In this state, when the switch SW1 is pushed, the power supply current flows through the reception terminals RA and RB and then along a path of light-emitting diode LY1→diode D1→resistor R1→switch SW1 (portion 1a)→ground GND as shown in FIG. 3, provided that the reception lines or the HUB 20 is normal. Thus, the light-emitting diode LY1 lights up in yellow to notify to the external that the reception lines are normal.

On the other hand, if there is a fault, such as disconnection, in the reception line or the HUB 20, the foregoing current path is interrupted. Thus, the light-emitting diode LY1 does not light up so that an occurrence of abnormality in the reception line or the HUB 20 is recognized.

On the other hand, when performing a conduction test of transmission lines, as shown in FIG. 2, the HUB 20 is connected to the transmission terminals SA and SB of the LAN tester 1, and the power supply switch SWP is closed. In this state, when the switch SW1 is pushed, the base current of the bipolar transistor Q3 flows to the ground GND through the resistor R8 and the switch SW1 (portion 1a) so that the bipolar transistor Q3 is turned on.

When the bipolar transistor Q3 is turned on, the power supply current flows through the transmission terminals SA and SB and along a path of switch SW1 (portion 2a)→resistor R14→blight-emitting diode LY2→ground GND as shown in FIG. 3, provided that the transmission lines or the HUB 20 is normal. Thus, the light-emitting diode LY2 lights up in yellow to notify to the external that the transmission lines or the HUB 20 is normal.

On the other hand, if there is a fault, such as disconnection, in the transmission line or the HUB 20, the foregoing current path is interrupted. Thus, the light-emitting diode LY2 does not light up so that an occurrence of abnormality in the transmission line or the HUB 20 is recognized.

As described above, the conduction test of the distribution cable is carried out through coils in the HUB or AUI without using a loopback tool. Specifically, since no loopback tool is used, the conventional distribution cable tracing operation becomes unnecessary so that the labor for the searching operation can be largely reduced.

Figure 4:
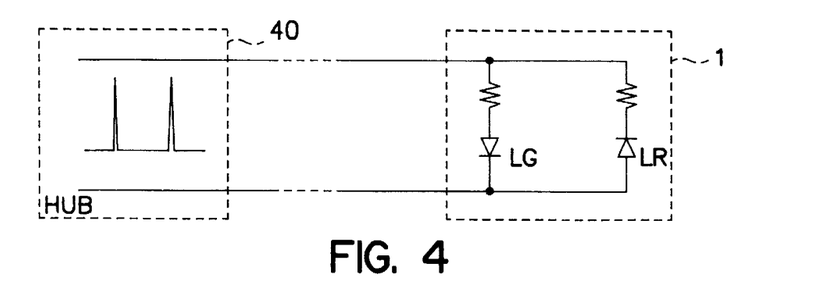
FIG. 4 is a diagram showing a connection relationship to a HUB when performing a polarity test using the LAN tester of the present invention.
Figure 5:
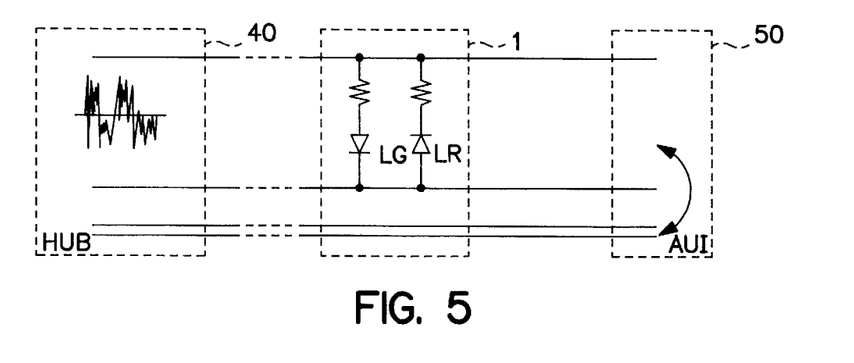
FIG. 5 is a diagram showing a connection relationship to a HUB and an AUI when performing communication monitoring using the LAN tester of the present invention.
Figure 6:
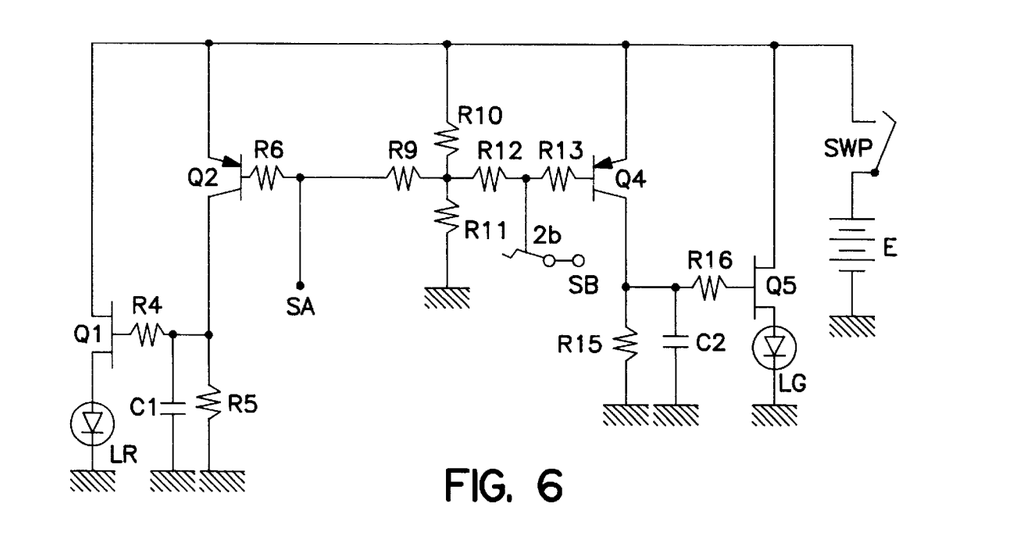
FIG. 6 is a diagram extracting the principal part of FIG. 1 for explaining an operation example in the polarity test and the communication monitoring using the LAN tester of the present invention.

FIG. 4 is a diagram showing a connection relationship to a HUB 40 when performing a polarity test using the LAN tester 1 of the present invention. FIG. 5 is a diagram showing a connection relationship to the HUB 40 and an AUI 50 when performing communication monitoring using the LAN tester 1 of the present invention. FIG. 6 is a circuit diagram extracting the principal part of FIG. 1 for explaining an operation example in the polarity test and the communication monitoring.

Specifically, in the polarity test and the communication monitoring, since the bipolar transistor Q3 is turned off, the bipolar transistors Q2 and Q4 are activated. By connecting the switch SW1 (portion 2b) to the terminal SB, the monitoring function of the pilot data is effected. Accordingly, the LAN tester 1 shown in FIG. 1 becomes equivalent to a circuit shown in FIG. 6.

As shown in FIG. 4, when performing a polarity test of the HUB 40, the HUB is connected to the terminals SA and SB of the LAN tester 1, and the power supply switch SWP is closed. In this state, since the switch SW1 is not pushed, the base current does not flow to the bipolar transistor Q3. Thus, the bipolar transistor Q3 is turned off, and a certain bias is applied to the bipolar transistor Q2 and the bipolar transistor Q4 based on a voltage dividing ratio of the power supply voltage set by the resistors R10 and R11.

Figure 7:
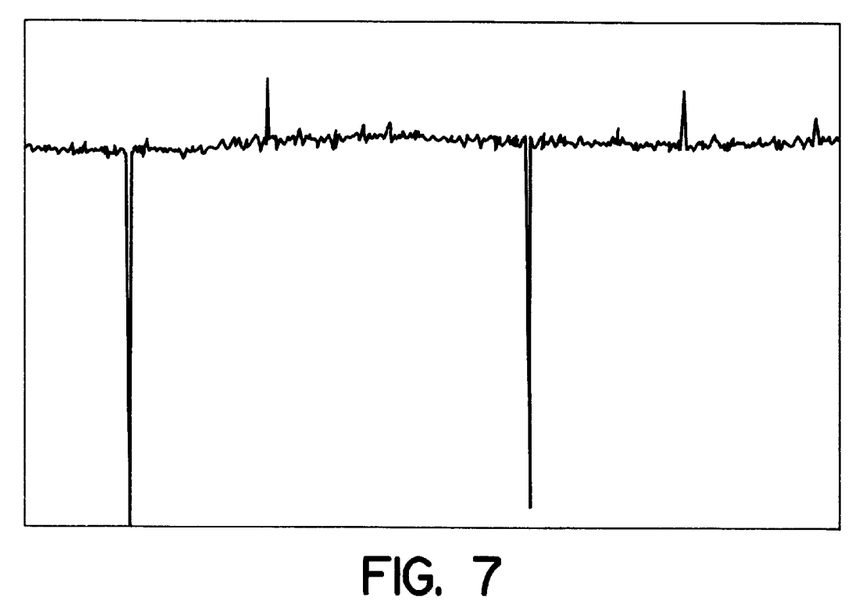
FIG. 7 is a diagram showing a waveform example of trigger pulses (carrier component) in FIG. 4.

In this state, if a pulse signal as shown in FIG. 7 is applied as trigger pulses such that positive pulses are successively applied to the terminal SA and negative pulses are successively applied to the terminal SB, the base current intermittently flows to the bipolar transistor Q4 corresponding to the application of pulses. Thus, the bipolar transistor Q4 is intermittently turned on.

When the bipolar transistor Q4 is intermittently turned on, intermittent pulse voltages are applied to the field-effect transistor Q5 via the resistor R16. However, since the pulse voltages are smoothed by a time constant circuit constituted by the resistor R15 and the capacitor C2, the field-effect transistor Q5 is turned on so that the light-emitting diode LG lights up in green to notify to the external that connection is performed with the correct polarity (forward polarity).

On the other hand, if negative pulses are successively applied to the terminal SA and positive pulses are successively applied to the terminal SB, the base current intermittently flows to the bipolar transistor Q2 corresponding to the application of pulses. Thus, the bipolar transistor Q2 is intermittently turned on.

When the bipolar transistor Q2 intermittently is turned on, intermittent pulse voltages are applied to the field-effect transistor Q1 via the resistor R4. However, since the pulse voltages are smoothed by a time constant circuit constituted by the resistor R5 and the capacitor C1, the field-effect transistor Q1 is turned on so that the light-emitting diode LR lights up in red to notify to the external that connection is performed with the wrong polarity (reverse polarity).

As described above, through the lighting-up of the light-emitting diode LG or the light-emitting diode LR, confirmation of presence/absence of the signal and confirmation of the polarity can be easily performed.

Figure 8:
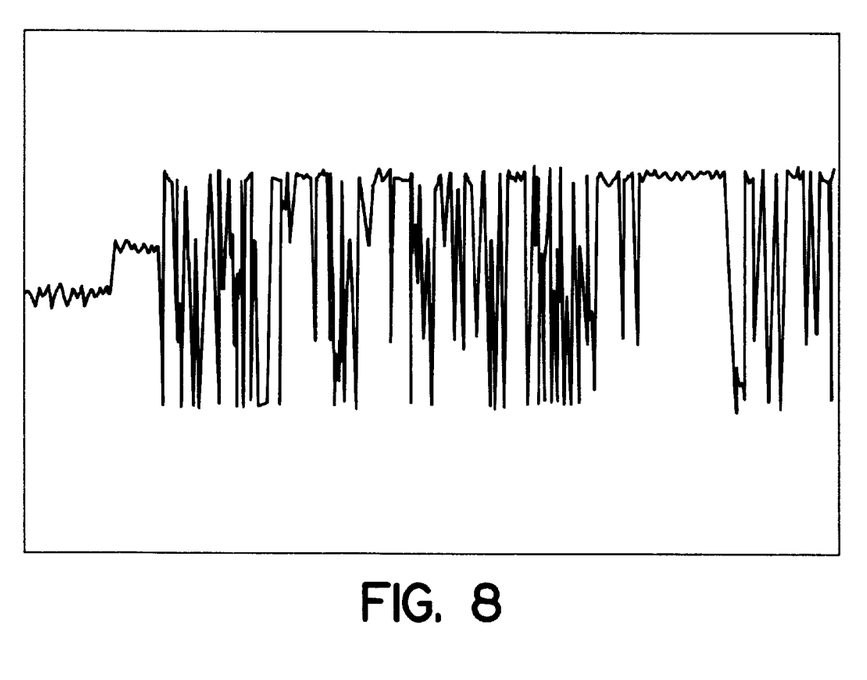
FIG. 8 is a diagram showing a waveform example during communication in FIG. 5.

On the other hand, when performing the communication monitoring, the LAN tester 1 of the present invention is inserted between communication cables and, as shown in FIG. 5, the HUB 40 and the AUI 50 are connected thereto. Accordingly, when a communication waveform as shown in FIG. 8 is applied, the communication state can be monitored through the foregoing operation in the polarity test.

Specifically, when a waveform is applied such that positive pulses are successively applied to the terminal SA and negative pulses are successively applied to the terminal SB, the light-emitting diode LG lights up in green. On the other hand, when a waveform is applied such that negative pulses are successively applied to the terminal SA and positive pulses are successively applied to the terminal SB, the light-emitting diode LR lights up in red. Accordingly, through the lighting-up of the light-emitting diode LG or LR, the signal can be easily monitored. As shown in FIG. 7, the signal voltages fed through the cable for activating the transistor Q1 or Q5 are in the form of very short pulses. Thus, even if the light-emitting diode LG or LR is activated to light up based on these pulses, it is difficult to recognize it with the naked eye. In view of this, a width of a lighting time is ensured using the capacitor C1 or C2 so as to make it easy to watch the lighting state.

As described above, the Judgment of the polarity can be easily performed by detecting directions of the signal pulses, that is, based on the on-off states of the two light-emitting diodes LG and LR.

Figure 9:
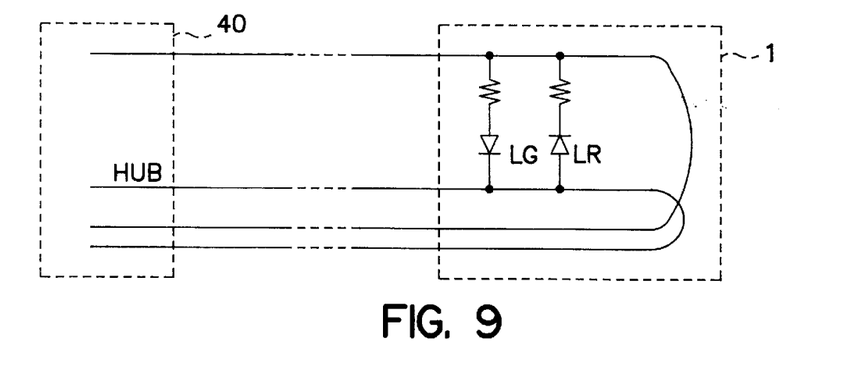
FIG. 9 is a diagram showing a connection relationship to a HUB or AUI when performing a simple operation test using the LAN tester of the present invention.

FIG. 9 is a diagram showing a connection relationship to the HUB 40 when performing a simple operation test using the LAN tester 1 of the present invention. FIG. 10 is a diagram extracting the principal part of FIG. 1 for explaining an operation example in the simple operation test using the LAN tester of the present invention.

Specifically, in the simple operation test of the HUB 40, since the bipolar transistor Q3 is turned off, the bipolar transistors Q2 and Q4 are activated. Further, since the pilot data monitoring function is activated by connecting the switch SW1 (portion 2b) to the terminal SB, the LAN tester 1 shown in FIG. 1 becomes equivalent to a circuit shown in FIG. 10(a). As shown in FIG. 10(b), connections between the terminal RA and the terminal SA and between the terminal RB and the terminal SB are established for looping by closing the switch SW2.

As shown in FIG. 9, when performing the simple operation test of the HUB 40, the terminals SA and SB of the LAN tester are connected to the terminals RA and RB, respectively, and the power supply switch SWP is closed. Through this, pulses in the transmission lines are sent to the reception lines so as to produce a false signal.

Specifically, as shown in FIG. 9, when the LAN tester 1 of the present invention is connected to the HUB, the HUB outputs again a signal voltage, as response data, into the transmission lines based on a looped-back signal. Accordingly, similar to the foregoing operation example in the communication monitoring, the simple operation test can be performed based on confirmation of PART/LINK of the HUB 40 and irregular lighting-up/off of the light-emitting diodes LG and LR.

When the LAN tester 1 of the present invention is connected to the AUI, a simple operation test can be performed, similar to the case of the HUB 40, based on lighting of R/L lamps of the AUI and irregular lighting-up/off of the light-emitting diodes LG and LR.

Specifically, the test of connection to the apparatus or the simple operation test can be accomplished simply by looping the signal lines.

As described above, by detecting the signal in the wiring to discriminate the presence/absence and the polarity thereof and performing the false operation test through the display using the light-emitting diodes and the looping by means of the LAN tester, the simple operation test of the HUB or AUI and the confirmation of connection between the apparatuses can be achieved. Therefore, the disconnection, short circuit and polarity checks of a twisted-pair cable of 10BASE-T as well as the simple connection test of the HUB or AUI can be achieved. Through this, if the LAN communication can not be achieved with the AUI, the test can be easily carried out to see whether the connections between the HUB and the cable and between the cable and the AUI are securely performed. Thus, operation failure or contact failure of the HUB, disconnection or short circuit of the cable, operation failure of the AUI or the like can be checked.

Further, in the conduction test, since the loopback tool, such as the loopback connector, is not used, it is not necessary to trace the distribution cable so that the searching operation is largely reduced, and further the test can be performed with one end of the cable connected to the apparatus. Thus, the confirmation of polarity and the operation test of the HUB or AUI can be easily carried out.

In the foregoing embodiments, when performing the conduction test with the HUB or AUI included, the HUB or AUI is limited to such a type having a pulse transformer which forms a dc loop in the HUB or AUI. On the other hand, no limiting conditions are given to the polarity test, the simple operation test, the communication monitoring and the like including the conduction test of the cable only.

Figure 11:
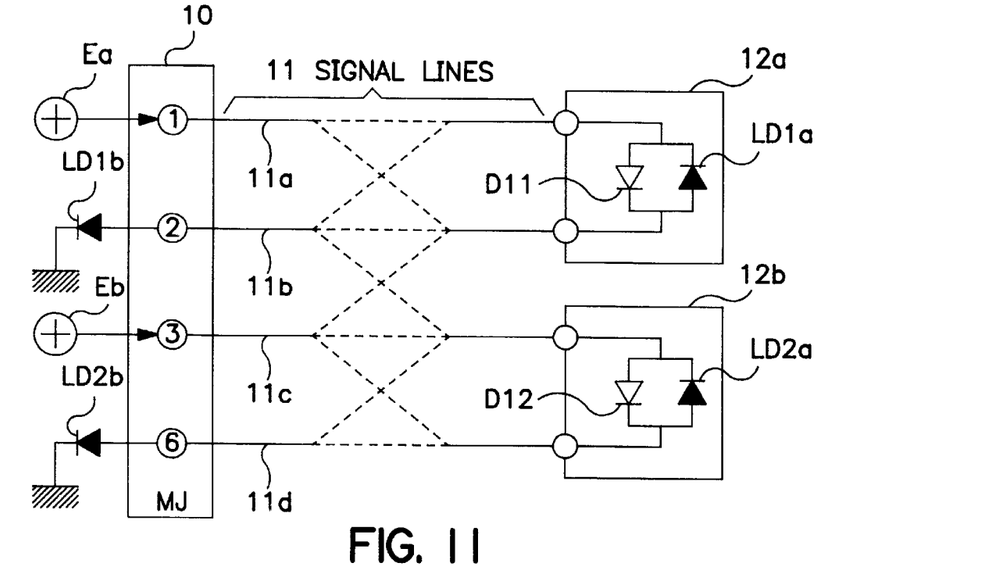
FIG. 11 is a diagram showing a structural example wherein a confirmation test of presence/absence of miswiring of a universal 8-pin modular Jack to be used in the LAN wiring is performed.

Now, explanation will be given to a case wherein a confirmation test of a connecting direction of the wiring is performed using the LAN tester of the present invention. FIG. 11 is a diagram showing a structural example wherein, for example, a confirmation test of presence/absence of miswiring of a universal 8-pin modular Jack to be used in the LAN wiring is performed. As shown in FIG. 11, the IAN tester is provided with, for example, a plurality of reverse connection confirmation circuits 12a, 12b . . . to be connected to corresponding reception terminals of the modular Jack. Each of the reverse connection confirmation circuits 12a and 12b includes a diode D11 (D12) and a light-emitting diode LD1a (LD2a) which are in reverse connection.

One-side ends of paired signal lines 11a and 11b are connected to pins 1 and 2 of a modular Jack (MJ) 10 to be tested, respectively. To one of the paired signal lines, for example, to the signal line 11a connected to the pin 1 of the MJ 10, is supplied the current from the forgoing power supply section 2 based on the dc voltage Ea. Further, between the signal line 11b connected to the pin 2 of the MJ 10 and a grounding line is connected a light-emitting diode LD1b which lights up upon energization. The other-side ends of the signal lines 11a and 11b are connected to the foregoing reverse connection confirmation circuit 12a.

As shown in the figure, paired signal lines 11c and 11d are further connected to pins 3 and 6 of the MJ 10. Accordingly, similar to the case of the foregoing paired signal lines 11a and 11b, the current based on the dc voltage Eb is supplied to the pin 3, a light-emitting diode LD2b is connected between the pin 6 and a grounding line, and a reverse connection confirmation circuit 12b is connected to the other-side ends of the paired signal lines 11c and 1d.

Upon performing the test, the currents based on the dc voltages Ea and Eb are fed from the power supply section 2 at different timings, respectively. Since the known technique can be employed for switching itself of the power feed timing, it is not shown in the figure. For the light-emitting diodes LD1b and LD2b, the circuits of the foregoing current detecting section 3 can be used as they are.

Now, a concrete example of the confirmation test of the connecting direction using the LAN tester with the foregoing structure will be described with reference to FIGS. 12 and 13.

Figure 12A:
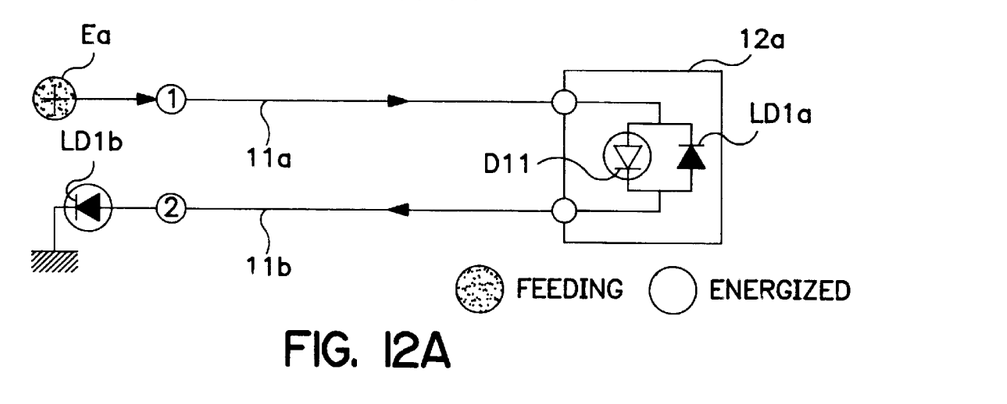
FIG. 12(a) is a diagram showing a state wherein paired signal lines are connected in the forward direction.
Figure 13A:
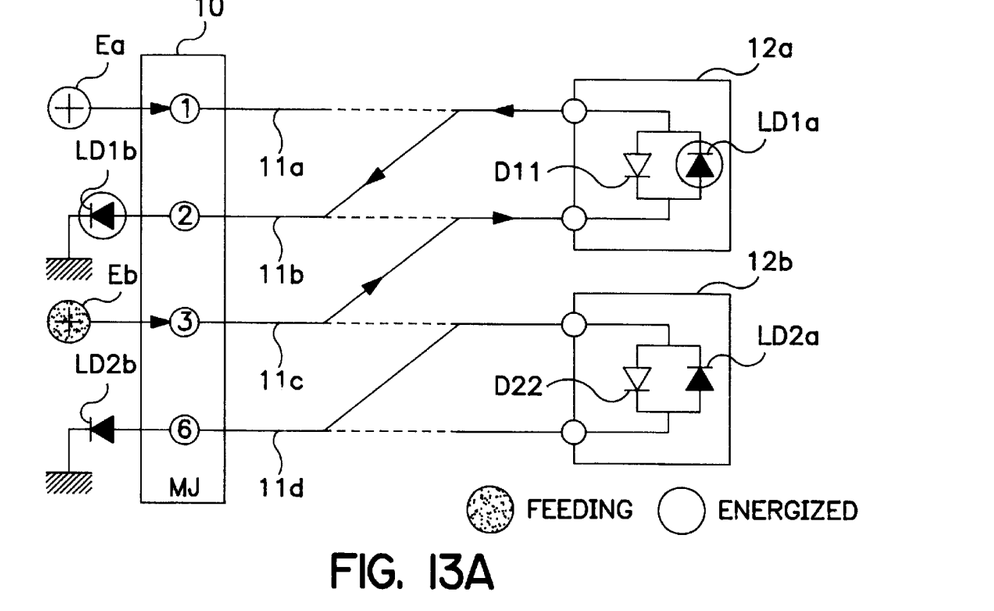
FIGS. 13(a) and (b) are diagrams both showing states wherein misconnection exists between different paired signal lines.
Figure 13B:
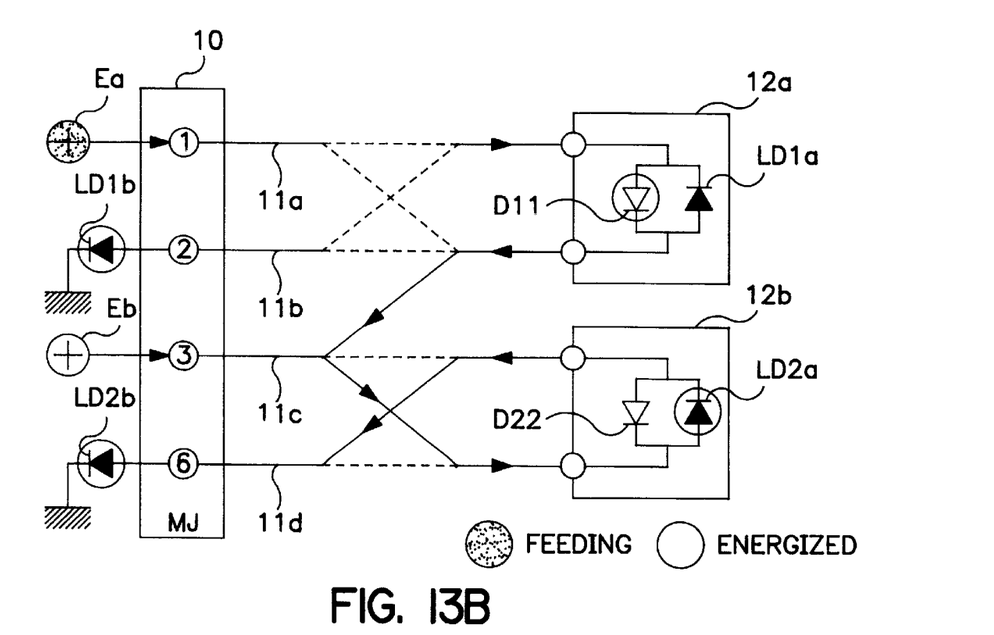

FIG. 12(a) is a diagram showing a state wherein the wiring of the MJ 10 is normal, that is, the paired signal lines 11a and 11b are connected in the forward direction. In this case, the current supplied through the pin 1 of the MJ 10 flows through the diode D11 of the reverse connection confirmation circuit 12a to reach the pin 2 of the MJ 10 so that the light-emitting diode LD1a lights up. Through this, it can be visually confirmed that the wiring of the MJ 10 is normal.

Figure 12B:
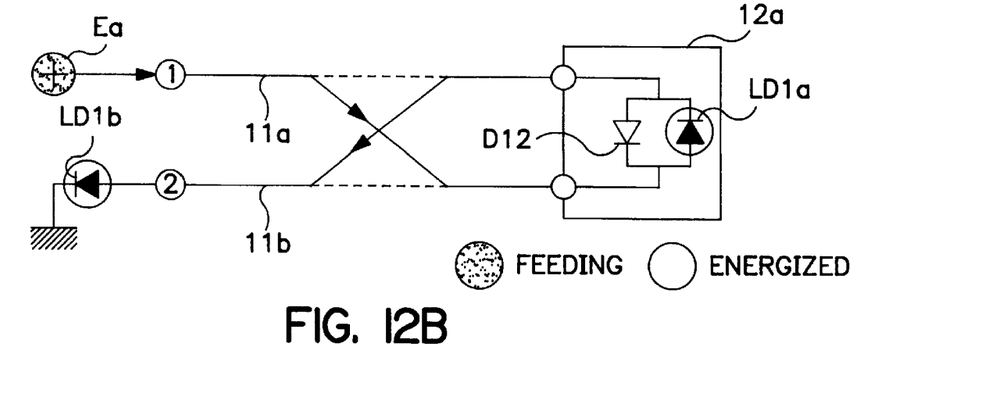
FIG. 12(b) is a diagram showing a state wherein the paired signal lines are reversely connected.

FIG. 12(b) is a diagram showing a state wherein the wiring of the MJ 10 is abnormal, that is, the paired signal lines 11a and 11b are reversely connected. In this case, the current supplied to the pin 1 of the MJ 10 reaches the reverse connection confirmation circuit 12a through the other signal line 11b. Thus, the light-emitting diode LD1a lights up. Further, since the current passing through the light-emitting diode LD1a reaches the pin 6 of the MJ 10, the light-emitting diode LD1b also lights up. Accordingly, in this case, it can be visually confirmed that the pins 1 and 2 of the MJ 10 are reversely connected.

Further, presence/absence of miswiring between the different paired signal lines in the MJ 10 can also be visually confirmed using the LAN tester. For example, in FIG. 13(a), when the current is fed to the pin 3 of the MJ 10, the light-emitting diodes LD 1a and LD 1b light up while the light-emitting diode LD2a, LD2b should light up in the normal wiring. This represents that, as shown in the figure, the wiring in the MJ 10 is offset upward in turn, and thus, the miswiring can be visually confirmed. On the other hand, as shown in FIG. 13(b), if the light-emitting diodes LD2a and LD2b, which should not light up, light up when the current is fed to the pin 1 of the MJ 10, it represents that the wiring of the MJ 10 is not normal. In this manner, the confirmation test of the connecting direction of the MJ 10 can be easily performed through combination of the timing of power feeding to the MJ 10 and the light-up pattern of the light-emitting diodes LD1a, LD1b, LD2a and LD2b.

Although the present invention has been explained showing the plurality of embodiments, the present invention is not limited to the foregoing embodiments. For example, although it is arranged that the energization state is detected using the light-emitting diode in the current detecting section 3 or the reverse connection confirmation circuit 12a, 12b, it may also be arranged that notification is made to the external through the meter display of flowing-current values or the sound (tone color or sound volume).

Industrial Applicability

As described above, the LAN tester according to the present invention is capable of determining, based on presence/absence of the current detection by the current detecting section, whether there is a fault, such as disconnection, in the signal line, and confirming, based on presence/absence of the pulse detection by the forward polarity detecting section and the reverse polarity detecting section, whether the signal lines are in the normal polarity or the reverse polarity.

Further, a false signal can be produced by looping back pulses in the transmission signal lines to the reception signal lines so as to confirm the operation state of the HUB or AUI to be connected. Further, the misconnection of the wiring, etc. can also be easily confirmed.

What is claimed is:

1. In a LAN including a line concentrator provided therein with a circuit for forming a dc loop, a method of performing a conduction test comprising the steps of:

connecting a LAN tester to a pair of signal lines while said pair of signal lines are connected to said line concentrator;

supplying a current to one of said pair of signal lines from the LAN tester; and detecting by the LAN tester said current flowing in the other of said pair of signal lines, said current returning from said line concentrator in the dc loop formed by said circuit provided in the line concentrator.

2. The method according to claim 1, wherein said line concentrator is one of a HUB and an AUI.

3. In a LAN including a line concentrator, a method of performing a polarity test of a signal sent from the line concentrator comprising the steps of:

connecting a first and a second terminal of a LAN tester to a pair of signal lines, respectively, while said pair of signal lines are connected to said line concentrator;

receiving at said first terminal of the LAN tester positive pulses from said line concentrator via one of said pair of signal lines and at said second terminal of the LAN tester negative pulses from said line concentrator via the other of said pair of signal lines; and detecting at a forward polarity detecting section of said LAN tester the positive pulses received at said first terminal and the negative pulses received at said second terminal when said first terminal is for receiving the positive pulses and said second terminal is for receiving the negative pulses, while detecting at a reverse polarity detecting section of said LAN tester the positive pulses received at said first terminal and the negative pulses received at said second terminal when said first terminal is for receiving the negative pulses and said second terminal is for receiving the positive pulses, whereby judging whether the signal sent from said line concentrator has a forward or reverse polarity.

4. The method according to claim 3, further comprising the steps of:

connecting said first and second terminals of the LAN tester to a third and fourth terminal of the LAN tester, and connecting said third and fourth terminals to said line concentrator via another pair of signal lines, thereby to return the positive and negative pulses received at said first and second terminals to said line concentrator as a false signal via said third and fourth terminals; and receiving at said first and second terminals of the LAN tester positive and negative pulses from said line concentrator as a response signal responsive to said false signal, whereby an operation test of said line concentrator is performed.

5. The method according to claim 3, wherein said line concentrator is one of a HUB and an AUI.

6. A LAN tester connected to a line concentrator of a LAN, said LAN tester comprising:

a first and a second terminal for receiving positive pulses and negative pulses, respectively, from said line concentrator via a first pair of signal lines;

a forward polarity detecting section for detecting the positive pulses and the negative pulses received from said line concentrator when said first terminal actually receives the positive pulses and said second terminal actually receives the negative pulses;

a reverse polarity detecting section for detecting the positive pulses and the negative pulses received from said line concentrator when said first terminal actually receives the negative pulses and said second terminal actually receives the positive pulses; and a loopback connector for connecting said first and second terminals to a third and a fourth terminal, respectively, thereby to return the received positive and negative pulses to said line concentrator as a false signal via a second pair of signal lines connecting said third and fourth terminals to said line concentrator.

7. The LAN tester according to claim 6, wherein said line concentrator is one of HUB and an AUI.

* * * * *